H. F. Bond
Bread Cutter.
Nº 24,851. Patented July 26, 1859.
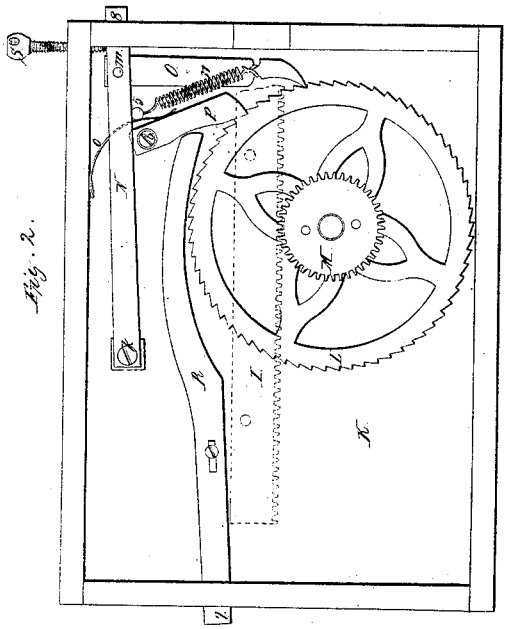
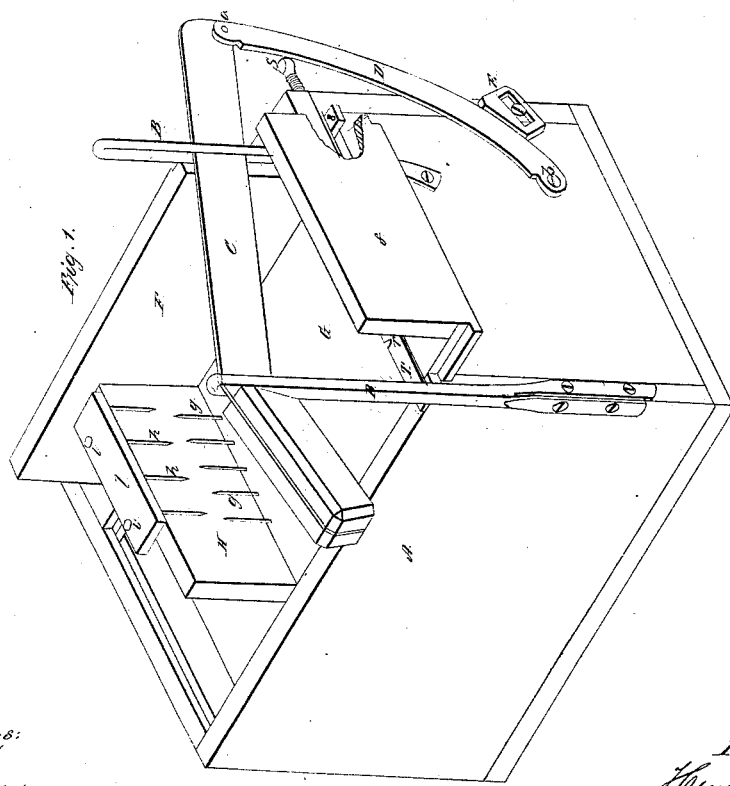
Witnesses:
Thos R Roach
T E Teschemacher
Inventor:
Henry F. Bond

UNITED STATES PATENT OFFICE.

HENRY F. BOND, OF HUDSON, WISCONSIN.

BREAD-SLICER.

Specification of Letters Patent No. 24,851, dated July 26, 1859.

*To all whom it may concern:*

Be it known that I, H. F. BOND, of Hudson, in the county of St. Croix and State of Wisconsin, have invented an Improved Bread-Slicer, of which the following is a full, clear, and exact description, reference being had to the accompanying drawings, making part of this specification, in which—

Figure 1 is a perspective view of the machine. Fig. 2, a plan of the gearing by which the movable tray is fed forward.

My present invention has for its object the production of a "bread slicer" by means of which a loaf of bread may be sliced into pieces of a required and uniform thickness, and consists in the employment of a movable tray on which the loaf is secured, and which is fed forward the requisite distance at each stroke of the knife.

That others skilled in the art may understand and use my invention, I will proceed to describe the manner in which I have carried out the same.

In the said drawings, A, is a rectangular box or stand (any convenient form of stand may be used) from which rise the guides B. The knife C, slides in these guides and is pivoted at *a* to an arm D, which is pivoted at *b*, to the end of the box A. An adjustable stop E, determines the distance to which the arm D, may descend; the knife may be thus adjusted so that it will not unnecessarily cut into the tray and deface it. A fixed rest F rises from one side of the box A, and serves to receive the side thrust of the loaf as the knife is pushed through it.

A movable tray G slides in dovetail grooves in the top of the box A, and is moved forward the required amount to give the desired thickness to the slices, at each stroke of the knife, in a manner which will be presently described. This tray has at its right hand or outer end a rest *f*, which rises perpendicularly from it, and serves to hold the slices from falling, as they are cut off, and keep them together until the whole loaf has been sliced when they may all be removed from the tray together. Near the opposite end of the tray is a clamp H, for securing the bread to the tray. It consists of a block rising from the tray with a series of sharp pins *g* rising from the tray immediately in front of it; the loaf is pressed down upon these points, which enter the crust. Another series of pointed wires *h*, projecting down from a block *l* are pressed into the crust over the lower pins *g*, and hold the loaf firmly to the tray. The block *l* is attached to the block H, by long pins *i*, which enter the top of the latter. A rack I, shown in red Fig. 2 is attached to the under side of the tray.

A lid K (Fig. 2) of the box A, placed immediately beneath the tray carries the gearing by which the tray is fed forward. This consists of a ratchet wheel L, to which is attached a pinion M, which engages with the rack I. A lever N is pivoted at *k*, to the lid K, and has pivoted to it at *m*, a dog O which engages with the wheel L. A spring *n*, attached to the dog O, and to the lid K, at 5, serves to keep the dog in contact with the wheel and also to throw back the lever N, after it has been pressed forward. A pawl P is pivoted at 6, to the lid K—and is held in contact with the wheel L, by a spring *o*. A long slotted rod R, projects a short distance from the end of the box A, at 7, and serves to trip the pawl P, and dog O, when it is required to push back the tray. A set screw S, regulates the throw of the lever N, or the distance to which it may be drawn back by the spring *n*. The lever N, projects at 8, beyond the end of the box A, into the path of the arm D, and is struck by it each time the knife is drawn up preparatory to making a cut.

A metal bar T is secured at each end to the top edges of the box A, and extends across above the tray G which slides freely beneath it, it has notches *r* in its edge to receive the pins *g*, as they are brought up against it. This bar serves to support the lower surface of the loaf, so that the knife C, may cut entirely through the bottom crust.

The following is the operation of this machine:—The loaf to be cut is secured on the tray G by means of the clamp H; the screw S is set so as to give the required feed to the tray, the knife C, is operated and the slices are cut. Each time the knife is raised preparatory to a cut, the arm D, strikes the end 8, of the lever N. This revolves the wheel L, and through the pinion M, and rack I feeds forward the tray G. The operation may then be continued until the loaf has been sliced.

What I claim as my invention and desire to secure by Letters Patent is—

1. The movable tray G operated automatically by the motion of the knife C, in the manner substantially as herein set forth.

2. I claim the bar T, arranged substantially as described for the purpose specified.

HENRY F. BOND.

Witnesses:
 THOS. R. ROACH,
 T. E. TESCHEMACHER.